Dec. 16, 1941.     A. W. RUSSELL     2,266,516
SAW-TOOTH WAVE GENERATOR
Filed March 29, 1939
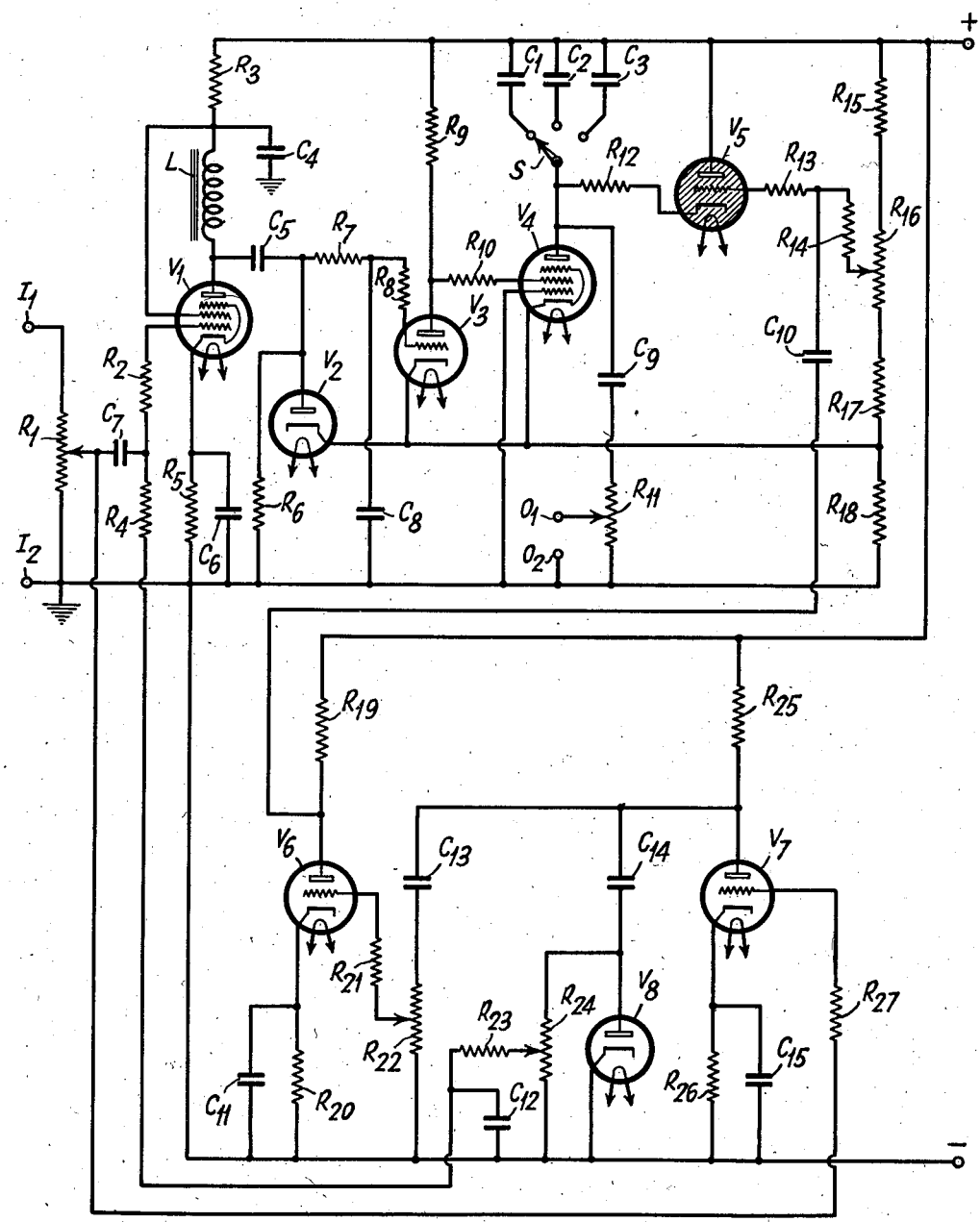
INVENTOR
ALFRED WALLACE RUSSELL
BY H.S.Brown
ATTORNEY Patented Dec. 16, 1941

2,266,516

UNITED STATES PATENT OFFICE 2,266,516

SAW-TOOTH WAVE GENERATOR

Alfred Wallace Russell, Surrey, England, assignor, by mesne assignments, to Radio Corporation of America, New York, N. Y., a corporation of Delaware Application March 29, 1939, Serial No. 264,697
In Great Britain March 30, 1938

8 Claims. (Cl. 250—36)

This invention relates to time bases for cathode ray oscillographs used for viewing recurrent wave forms, and its object is to provide an improved arrangement whereby the time base frequency is controlled in such manner that it automatically varies in accordance with variations in the frequency of recurrence of the wave form under examination, thus enabling a stationary picture to be obtained without adjustment by the user.

According to the invention for this purpose a time base of the type comprising a condenser which is alternately charged from a D. C. source and discharged by a gas-filled triode or other equivalent device is provided with means whereby the charging current of the condenser is automatically controlled by the wave form to be examined so that the said current, and hence the time base frequency, increases with increasing frequency of the wave form.

If, as is preferred, the condenser is charged through a pentode or other "constant-current" charging valve in well known manner, a convenient way of applying the invention resides in controlling the potential of one of the electrodes of the charging valve for the purpose of varying the charging current. We have, for example, obtained successful results by controlling the potential of the screen grid of a charging pentode.

In order that the invention may be more readily understood one embodiment will now be described by way of example with reference to the accompanying drawing.

In this figure, the wave to be examined is impressed upon a potentiometer, the adjustable section thereof being connected to the control grid of an amplifying tube. In the output circuit of the tube is a frequency discriminating element which in this case is an inductive member. Signals appearing across the inductance are rectified, and rectified signals are impressed onto the control grid of a further amplifying tube. The output of this latter amplifying tube is connected to the input of a vacuum tube which stores energy in a selected condenser, the condenser being connected in the plate circuit of the tube. Connected in parallel with the storage condenser is a gaseous discharge path which in this case is a grid glow or "thyratron" tube, the control grid of this tube being energized by a timing control circuit.

The time base proper in the embodiment illustrated is of a well known character, comprising a condenser $C_1$, a charging pentode $V_4$ and a discharging device in the form of a gas-filled triode $V_5$. The condenser $C_1$ is connected to the anode of $V_4$ by a switch S; by moving switch S to the right the condenser $C_1$ may be replaced by $C_2$ or $C_3$, the magnitudes of these condensers being such as to adjust the number of pictures per sweep on the screen of the cathode ray tube (not shown). The cathode ray tube is fed from terminals $O_1$, $O_2$ which are connected respectively to the tapping point and the earthed end of a potentiometer resistance $R_{11}$ connected at its upper end to the anode of $V_4$ through a condenser $C_9$. The anode of $V_4$ is also connected through a resistance $R_{12}$ to the cathode of $V_5$, which latter is timed by its grid circuit in a manner indicated later.

The signal whose wave form is to be examined is supplied by way of input terminals $I_1$, $I_2$ to the ends of a potentiometer resistance $R_1$ whose tapping point is connected through a condenser $C_7$ and resistance $R_2$ to the control grid of a pentode $V_1$. The anode circuit of $V_1$ includes an inductance L, whose reactance is small compared with the internal impedance of $V_1$, and a decoupling resistance $R_3$. The junction between L and $R_3$ is connected to earth by a decoupling condenser $C_4$. The lower end of inductance L is connected through a condenser $C_5$ to the anode of a diode $V_2$ and the said anode is connected through resistance $R_6$ to earth and through resistances $R_7$ and $R_8$ to the grid of a triode $V_3$. The said grid is connected to earth through a condenser $C_8$ and the cathodes of $V_2$, $V_3$ and $V_4$ are connected as shown to the lower end of a resistance $R_{17}$ in a chain of resistances $R_{15}$, $R_{16}$, $R_{17}$ and $R_{18}$ forming a potentiometer across the H. T. supply, while the cathode of $V_1$ is connected to earth through a bias resistance $R_5$ and a by-pass condenser $C_6$. The anode of $V_3$ is connected to the positive side of the H. T. supply by resistance $R_9$ and is also connected to the screen grid of pentode $V_4$ by a resistance $R_{10}$.

Since the resistance of inductance L is small compared with the internal impedance of $V_1$ the output of this circuit increases linearly with frequency. The output voltage is rectified by $V_2$ and the rectified voltage applied directly to the grid of $V_3$ so that the grid of $V_3$ becomes more negative when the frequency of the signal, and hence the output from $V_1$, increases; since the anode of $V_3$ is directly coupled to the screen grid of $V_4$ the resulting increase in the positiveness of the anode of $V_3$ causes an increase in the screen grid potential supplied to $V_4$ and an increase in the charging current flowing through $V_4$. Hence, the charging current of the condenser $C_1$, $C_2$ or $C_3$ as the case may be increases in accordance with increase in frequency of the signal applied to the input circuit.

As already stated, the operation of $V_5$ is timed by suitable control in its grid circuit. This control is effected by the two valves $V_6$, $V_7$ shown at the lower part of the diagram. The grid of $V_5$ is connected by way of resistance $R_{13}$ and $R_{14}$ to a variable tapping on the resistance $R_{16}$ and also through resistance $R_{13}$ and condenser $C_{10}$ to the anode of $V_6$. $V_6$ is controlled by way of resistance $R_{21}$, potentiometer $R_{22}$ and condenser $C_{13}$ from the anode of $V_7$ whose grid is connected to the tapping of the potentiometer $R_1$ by way of series resistance $R_{27}$. $V_6$ and $V_7$ are connected to the positive side of the H. T. supply by way of resistances $R_{19}$, $R_{25}$ respectively and their cathodes are connected to the negative supply line by way of resistances $R_{20}$, $R_{26}$ and by-pass condensers $C_{11}$, $C_{15}$ respectively. It will be seen from the diagram, without further explanation, how the signal is caused through the synchronizing amplifier $V_6$, $V_7$ to control the valve $V_5$ at the appropriate times.

In the circuit so far described, it has been assumed that the amplitude of the wave form remains substantially constant. If large variations of amplitude occur, the examination of the wave form may be rendered more difficult and we accordingly prefer to provide means whereby the amplitude may be controlled. Although in some cases manual control can be provided, it is advantageous to provide automatic control. For this purpose, we have shown the anode of $V_7$ connected through a condenser $C_{14}$ to the anode of a diode rectifier $V_8$ which is also connected to a tapped load resistance $R_{24}$. The tapping of $R_{24}$ is connected to a smoothing circuit $R_{23}$, $C_{12}$ and the smoothed voltage thus obtained is fed through resistances $R_4$ and $R_2$ to the control grid of the pentode $V_1$.

The range of frequencies over which steady pictures may be automatically obtained will, of course, depend upon the circuit adopted.

What is claimed is:

1. A sawtooth wave generator comprising energy storage means, means for storing energy in said energy storage means, a discharge path connected substantially in parallel with said energy storage means, frequency discriminating means, means for impressing signals from an external source onto said frequency discriminating means, and means responsive to the amplitude of the signal developed through said frequency discriminating means for directly controlling the rate of energy supplied to said energy storage means.

2. Apparatus in accordance with claim 1 wherein said energy storage means comprises electrostatic energy storage means.

3. Apparatus in accordance with claim 1 wherein said energy storage means comprises a plurality of capacitive members and means are provided for selectively energizing said capacitive members.

4. A sawtooth wave generator comprising energy storage means, means for storing energy in said energy storage means, a discharge path connected substantially in parallel with said energy storage means, a first thermionic vacuum tube, a frequency discriminating element connected in the anode-cathode path of said first thermionic tube, means for impressing signals from an external source onto a control electrode-cathode path of said thermionic tube, a rectifier, means for impressing the signal developed in said frequency discriminating element onto said rectifier, and means for utilizing at least a portion of the output signal from said rectifier to control the rate of energy storage.

5. Apparatus in accordance with claim 4 wherein there is provided in addition means for controlling the conductive state of the discharge path connected substantially in parallel with the energy storage means.

6. Apparatus in accordance with claim 4 wherein said frequency discriminating element comprises an inductive member having a high ratio of inductance to resistance.

7. The method of developing a deflection wave whose frequency bears a definite relationship to the frequency of a wave formation to be observed comprising linearly storing energy, and controlling the rate of storage of said energy directly in accordance with the frequency of the signal to be observed.

8. Apparatus in accordance with claim 1, wherein there is provided in addition means for maintaining the signals received from an external source at substantially the same amplitude.

ALFRED WALLACE RUSSELL.